United States Patent [19]

Hall

[11] 3,719,540

[45] March 6, 1973

[54] PREPARATION OF TRANSVERSELY FIBRILLATED FILM

[75] Inventor: John N. Hall, Newark, Del.

[73] Assignee: Hercules Incorporated, Wilmington, Del.

[22] Filed: May 4, 1970

[21] Appl. No.: 34,030

[52] U.S. Cl. .................156/267, 156/167, 156/229
[51] Int. Cl. .............................................B32b 31/16
[58] Field of Search...264/DIG. 8; 156/167, 229, 267

[56] References Cited

UNITED STATES PATENTS

| 3,501,565 | 3/1970 | Kalwaites et al. | 264/282 |
| 3,471,604 | 10/1969 | Butcher | 264/288 |
| 3,336,174 | 8/1967 | Dyer et al. | 156/167 |
| 3,003,304 | 10/1961 | Rasmussen | 264/DIG. 47 |
| 3,350,491 | 10/1967 | Rasmussen | 264/288 |
| 2,840,137 | 6/1958 | Wortz | 156/267 |
| 3,322,613 | 5/1967 | Rasmussen | 156/229 |

Primary Examiner—Benjamin A. Borchelt
Assistant Examiner—J. V. Doramus
Attorney—John W. Whitson

[57] ABSTRACT

Transversely fibrillated films are prepared by embossing a molten thermoplastic film with transverse striations, transversely stretching the film while leaving an unstretched edge portion which, after stretching is at least 100 percent thicker than the embossed and stretched section. The film is then subjected to fibrillating stress under conditions whereby the thick edges are not affected. These edges then serve to hold the transverse fibers, resulting from the fibrillation, together in an integral structure for further handling. The fibrillation structure is useful for preparing laminar nonwoven fabrics having the filaments in different layers disposed at an angle to one another.

7 Claims, 5 Drawing Figures

PATENTED MAR 6 1973 3,719,540
SHEET 1 OF 2
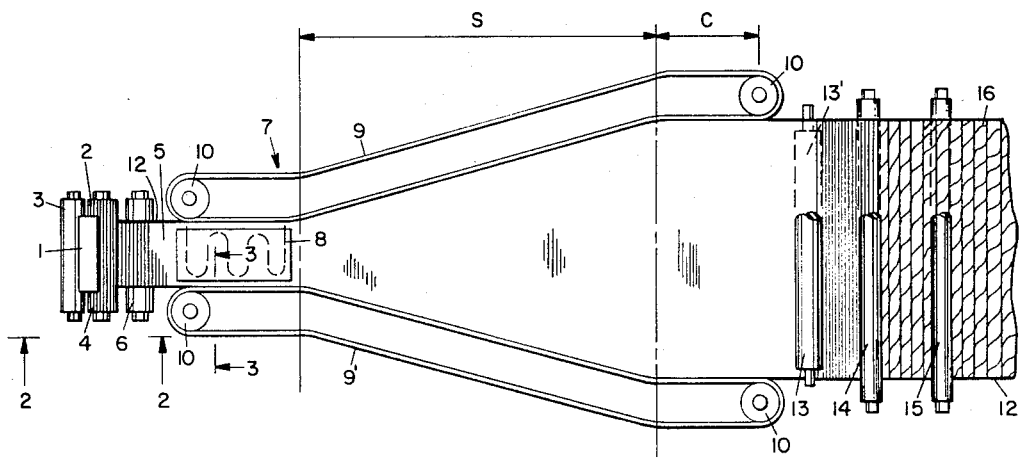
FIG. I
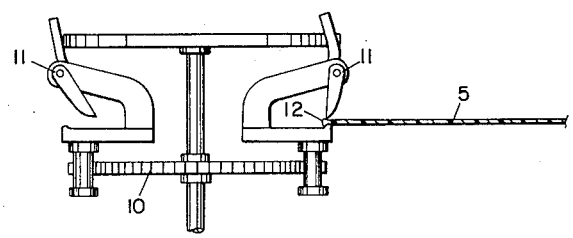
FIG. 3
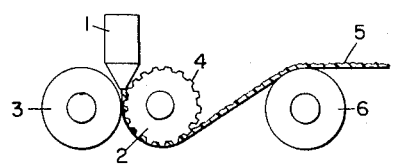
FIG. 2
JOHN N. HALL
INVENTOR
BY William S Alexander
ATTORNEY

JOHN N. HALL
INVENTOR

BY William S Alexander
ATTORNEY

PREPARATION OF TRANSVERSELY FIBRILLATED FILM

This invention relates to a method of producing a transversely oriented, transversely striated, transversely fibrillated film.

The textile fiber art has recently become interested in the preparation of fibers and filaments by means of the fibrillation of oriented thermoplastic film. Originally the fibrillation was carried out on flat, longitudinally oriented films to prepare either individual, random length staple fibers or, by a lesser degree of fibrillation, a coherent network structure of such staple fibers. In a more recent development, continuous filaments have been prepared by fibrillating striated films, wherein the fibrillating action is limited to the thin web sections between the striations. Here again, the fibrillation can either be complete so as to form individual continuous filaments or, to a lesser degree, to form a continuous network structure of interconnected continuous filaments.

Continuous filaments prepared by the fibrillation technique have been found useful in the preparation of nonwoven, laminar scrims. One such product comprises continuous filaments as a warp with other such filaments laminated thereto at an angle of about 20° to 90° to give strength properties superior to those of conventional woven fabrics. These have heretofore been prepared by laying the warp filaments on a mandrel and winding the cross filaments around them. A precise 90° crosslay is difficult to accomplish with such a method. It is an object of this invention to provide a product which can conveniently be laminated with a conventional fibrillated, longitudinally striated film to produce a nonwoven fabric wherein the cross filaments can be disposed at any desired angle from 45° to 90° to the warp filaments, by a simple lamination process.

A further object of the invention is to produce a transversely oriented, transversely striated, transversely fibrillated film. This and other objects of the invention are accomplished by a process which comprises:
a. providing an unoriented thermoplastic film;
b. maintaining the film in a softened condition and embossing said film with a plurality of equally spaced transverse ribs to form a transversely striated film;
c. gripping the edges of the transversely striated film and laterally stretching said film without stretching the edges where said film is gripped, and
d. subjecting the area of the laterally stretched film between the unstretched edges to a stress to effect splitting thereof between the transverse ribs.

The invention is illustrated in the attached drawing, in which;

FIG. 1 is a plan view of apparatus suitable for carrying out the invention;

FIG. 2 is a section view along line 2—2 of FIG. 1 showing the film-forming means;

FIG. 3 is a view along line 3—3 of FIG. 1 of the film showing the thick edges employed in the process.

Figure 4:
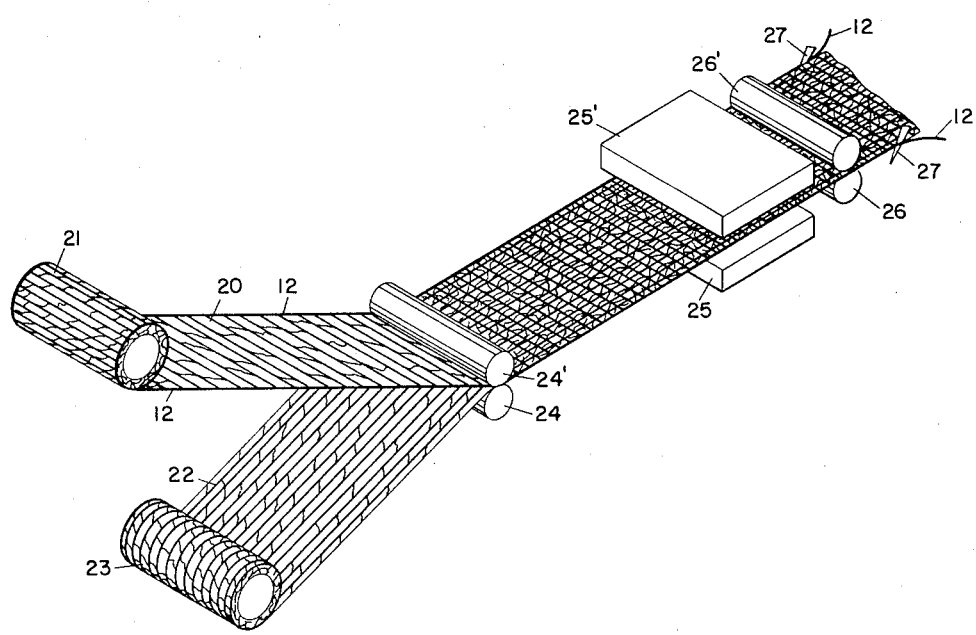
FIGS. 4 and 5 are perspective views of the process employed to prepare laminar nonwoven webs using the products of the process of this invention.

In preparing a transversely fibrillated striated film according to the invention as depicted in FIGS. 1 and 2, molten polymer is extruded by an extruder 1 into the nip between an embossing roll 2 and its accompanying pressure roll 3. The embossing roll is provided with a plurality of thin transverse ribs 4 which imprint the desired transverse striations onto the soft film. The transversely striated film 5 is then passed over a guide roll 6 and into a tenter frame, indicated generally at 7, where it is reheated by radiant heaters 8 disposed above and below the film. The tenter comprises a pair of endless chains 9 and 9' revolving around appropriate sprockets 10 and carrying film gripping clips 11 (FIG. 3) capable of griping the edges 12 of the film securely without damaging them and thereafter diverging to accomplish a lateral stretching and orientation of the transversely striated film in the area designated S in FIG. 1. The chains cease to diverge and run parallel for a short distance in the area C to allow the film to cool.

The transverse stretching of the film is effected at the temperature, below its crystalline melting point, most suitable for orienting a film of the particular polymer employed. A relatively high degree of orientation is required to render the film sufficiently fissile for fibrillation. In most cases, transverse draw of at least about 4X is required.

From this point on in the process, it is necessary that the edges 12 of the transversely striated film be thicker than the remainder of the film in order for the film to maintain its structural integrity during and following fibrillation thereof. In the normal course of extruding the film and transversely stretching it via the tentering technique, the undrawn edges will be thicker than the drawn portion of the film by a factor equal to at least the lateral draw ratio. If greater thickness is desired, the film can be provided with edge beads prior to drawing, i.e., during the extrusion and embossing steps.

The stretched film is released by the clips at the exit of the tenter and the chains pass around their respective sprockets 10 to return to the starting point. The film passes on and is fibrillated by passing between upper and lower fibrillation rolls 13 and 13' respectively. The fibrillation rolls are rubber covered rolls adapted to contact the area between the thickened edges and are rotated at different peripheral speeds so that they exert a forward shearing action on the film. The forward shearing action causes the film to rupture in the connecting webs between striations. However, since the stress is applied only to the area between the edges and the edges are heavier than the rest of the film, the edges are not stretched or distorted and the striations are not permanently displaced relative to one another to any significant degree, but remain in essentially their initial position on passing the fibrillation rolls.

Other fibrillation methods can also be employed. For example, the film can be subjected on each of its surfaces to a high pressure stream of gas, e.g., air, which will cause the thin webs between striae to split, but will leave the edges intact. Instead of differentially driven rollers, differentially driven rubber belts can be used. Other means which can be used include rubbing, brushing, and combing. The method employed is not critical so long as the stress applied to the film leaves the edges intact for further handling.

In order to separate the individual filaments from one another, the film is subjected to a longitudinal draw applied to the edges. The amount of draw applied is determined by the filament density (number of filaments per unit length) desired in the final product and this in turn determines the weight per unit area of the fibrillated film. If the maximum filament density is desired, drawing can be omitted. Generally, a draw of 600 percent will be the maximum used. As shown in FIG. 1, this drawing is accomplished by means of differentially driven draw rolls 14 and 15. The webs between striations having been substantially completely ruptured by the fibrillation, the drawing will be confined to the edges. Any portion of the web which remains intact following fibrillation will be pulled apart by the longitudinal drawing stress, leaving, at most, a network of low denier fibrils 16 connecting adjacent filaments. The presence and density of such a fibril network will depend upon the degree of draw to which the edges of the film are subjected and on the intensity of the fibrillation operation to which the film has been subjected. For most applications of these products the presence of this fibril network is not harmful and can even be desirable. The thick edges 12 of the film serve to hold the fibrillated, interconnected structure together for later handling. Without these thick edges, the structure would be reduced to a mass of individual, unconnected fibers poorly suited for further handling. The edges should be relatively uniform and at least 100 percent thicker than the remainder of the film after transverse stretching. This thickness is needed in order for the edges to withstand distortion in the longitudinal stretching operation and thus permit uniform, controllable forward stretching and controlled opening of the fibrillated web. Otherwise the thickness is not critical.

As shown in FIG. 1, drawing of the edges 12 to effect separation of the transverse filaments is accomplished as part of an integral process with film formation, drawing and fibrillation. This is not always necessary. If desired, the fibrillated film can be collected onto mill rolls and drawing can be omitted altogether or it can be accomplished when the film is incorporated into a structure.

As stated hereinabove, one substantial utility of the filamentary structure prepared as described is in the preparation of laminar nonwoven fabrics having continuous filaments in both the longitudinal and transverse directions. To prepare such fabrics it is only necessary to lay up one or more layers of the transversely oriented, fibrillated product prepared by the process of this invention with one or more layers of the network structure prepared by fibrillation of conventional, longitudinally striated film, all of the layers being fed directly in-line, as produced, or from respective mill rolls and laid up parallel to their longitudinal axes.

As depicted in FIG. 4, a transversely striated fibrillated film 20 and a longitudinally striated fibrillated film 22 are fed off mill rolls 21 and 23, respectively, into the nip of pull rolls 24 and 24'. The laminar structure, having the cross filaments from the transversely striated film at substantially a 90° angle to the longitudinal filaments is drawn by pull rolls 26 and 26' under radiant heaters 25 and 25' to effect preheating of the filaments prior to bonding between pull rolls 26 and 26'. Pull rolls 26 and 26' are adapted to contact the films without touching the thick edges of the transversely striated film.

Bonding is depicted in FIG. 4 as being accomplished by preheating with radiant heaters. However, any convenient and conventional bonding technique can be employed such as adhesive bonding, ultrasonic energy, or calendering. Moreover, in methods such as radiant heating and calendering, it is frequently convenient to use bicomponent striated webs having one lower melting component to act as a bonding agent. Following the bonding of the structure into a coherent, laminar fabric, the thick edges on the transversely striated film are removed by means of selvedge slitting device 27.

Figure 5:
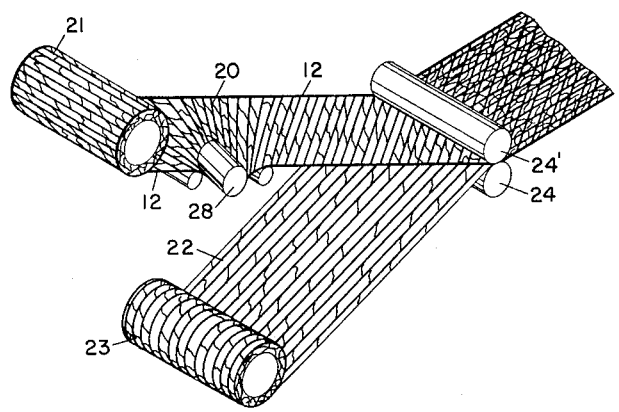

As shown in FIG. 5, it is also possible to prepare fabrics wherein the cross filaments are at an angle less than 90° with respect to the longitudinal filaments. This can be accomplished by causing one of the edges to travel a longer distance than the other, as, e.g., around idler roll 28 as the fibrillated film is removed from its source and before being laminated with its longitudinally striated counterpart. To create the slack needed to travel around idler roll 28, one edge of the film is pulled back with respect to the other prior to engaging the film in the nip rolls 24 and 24'. Being an open network structure, the film skews easily at this point without putting any undue stress on it at any point and the filaments become skewed with respect to the longitudinal axis of the film. Since both edges will be advanced at the same rate by pull rolls 24 and 24', the cross filaments will remain skewed with respect to the long axis of the transversely striated film and will thus be skewed with respect to the long axis of the longitudinally striated film. The angle which results can be any angle from about 20° to 90°, depending on the amount of slack in the edge 12. Preferably, the angle is at least 45°.

The process of the invention can be used with any of the known film and fiber-forming thermoplastic polymers which are conventionally used in preparing synthetic fibers. Exemplary of such polymers are polyethylene, polypropylene, nylon, poly(ethylene terephthalate) and the acrylics such as poly(acrylonitrile) and its related copolymers.

What I claim and desire to protect by Letters Patent is:

1. A process for preparing a cross-laid non-woven laminar fabric which comprises providing a fibrillated, transversely striated, transversely oriented film having alternating relatively thick transverse ribs and relatively thin transverse webs and having thick edges, laminating said film with a fibrillated longitudinally striated film, bonding said striated films and thereafter removing the thick edges from the transversely striated film.

2. The process of claim 1 including the additional step of causing one edge of the fibrillated, transversely striated film to travel a greater distance from its source of supply to the pint where the two films are engaged for forming a laminate, whereby the ribs of said transversely striated film become skewed with respect to the longitudinal axis of said film.

3. A process for providing a transversely striated, transversely oriented fibrillated film which comprises:
providing an unoriented thermoplastic film;
forming a plurality of equally spaced transverse striations in said film to provide a transversely striated film having alternating relatively thick transverse ribs and relatively thin transverse webs;

forming edges on said film which are substantially thicker than said thin transverse webs;

gripping the thick edges of the transversely striated film and laterally stretching said film to orient said film transversely; and subjecting the transversely oriented film to a fibrillating stress to effect splitting of the relatively thin transverse webs.

4. The process of claim 3 including longitudinally drawing the thick edges after subjecting the film to a fibrillating stress to effect separation of the transverse ribs.

5. The process of claim 4 wherein the transverse ribs are substantially separated from one another in the areas intermediate the edges.

6. The process of claim 3 where the fibrillating stress is effected by passing the transversely striated film through a high pressure gas stream.

7. The process of claim 3 where the fibrillating stress is effected by passing the transversely striated film between a pair of rubber-covered pinch rolls rotating at different peripheral speeds, said pinch rolls being adapted to contact the film only in the area between the thick edges.

* * * * *